United States Patent
Zhuang

(10) Patent No.: US 10,974,683 B2
(45) Date of Patent: Apr. 13, 2021

(54) SAFETY AIRBAG

(71) Applicant: YANFENG KSS (SHANGHAI) AUTOMOTIVE SAFETY SYSTEMS CO., LTD, Shanghai (CN)

(72) Inventor: Xiao Zhuang, Shanghai (CN)

(73) Assignees: Yanfeng Automotive Safety Systems Co., Ltd., Shanghai (CN); Shanghai Lingang Joyson Safety Systems Co., Ltd., Shanghai (CN)

( * ) Notice: Subject to any disclaimer, the term of this patent is extended or adjusted under 35 U.S.C. 154(b) by 0 days.

(21) Appl. No.: 16/077,739

(22) PCT Filed: May 23, 2017

(86) PCT No.: PCT/CN2017/085427
§ 371 (c)(1),
(2) Date: Aug. 14, 2018

(87) PCT Pub. No.: WO2017/202280
PCT Pub. Date: Nov. 30, 2017

(65) Prior Publication Data
US 2019/0071047 A1 Mar. 7, 2019

(30) Foreign Application Priority Data
May 25, 2016 (CN) .......................... 2016 1 0356891

(51) Int. Cl.
*B60R 21/232* (2011.01)
*B60R 21/2342* (2011.01)
(Continued)

(52) U.S. Cl.
CPC .......... *B60R 21/232* (2013.01); *B60R 21/213* (2013.01); *B60R 21/239* (2013.01);
(Continued)

(58) Field of Classification Search
CPC ............. B60R 21/232; B60R 21/2342; B60R 21/239; B60R 2021/23382; B60R 21/213;
(Continued)

(56) References Cited

U.S. PATENT DOCUMENTS 4,448,228 A 5/1984 Hashimoto et al.
5,533,753 A * 7/1996 Abraham .............. B60R 21/239
280/739

(Continued)

FOREIGN PATENT DOCUMENTS

CN 102371962 A 3/2012
CN 203305952 U 11/2013
(Continued)

OTHER PUBLICATIONS

Machine Translation of DE-102009053381-A1 (Year: 2009).*
(Continued)

*Primary Examiner* — James A English
*Assistant Examiner* — Kurtis Nielson
(74) *Attorney, Agent, or Firm* — Kilpatrick Townsend & Stockton, LLP

(57) ABSTRACT

A safety airbag, comprising: an airbag (2) having a side air curtain (21) and a front air bag (22); an gas-guiding bag (3), which guides gas generated from a gas generator (4) into the airbag (2); and a backflow prevention assembly (7), which is connected to the gas-guiding bag (3) and which may prevent the gas in the front air bag (22) from flowing back to the side air curtain (21) when the front air bag (22) is extruded. The safety airbag may protect a occupant's head and effectively lessen the impact on the head or neck of the occupant.

8 Claims, 5 Drawing Sheets

(51) Int. Cl.
*B60R 21/239* (2006.01)
*B60R 21/213* (2011.01)
*B60R 21/231* (2011.01)
*B60R 21/2338* (2011.01)
*B60R 21/00* (2006.01)
*B60R 21/26* (2011.01)

(52) U.S. Cl.
CPC ...... *B60R 21/2338* (2013.01); *B60R 21/2342* (2013.01); *B60R 21/23138* (2013.01); *B60R 2021/0032* (2013.01); *B60R 2021/0048* (2013.01); *B60R 2021/23153* (2013.01); *B60R 2021/23382* (2013.01); *B60R 2021/26094* (2013.01)

(58) Field of Classification Search
CPC .......... B60R 21/23138; B60R 21/2338; B60R 2021/26094; B60R 21/26
See application file for complete search history.

(56) References Cited

U.S. PATENT DOCUMENTS

| | | | | |
|---|---|---|---|---|
| 5,803,121 A * | 9/1998 | Estes | ............... | B60R 21/239 137/849 |
| 6,056,318 A * | 5/2000 | Braunschadel | ....... | B60R 21/239 280/739 |
| 6,123,355 A | 9/2000 | Sutherland | | |
| 6,152,481 A | 11/2000 | Webber et al. | | |
| 6,431,589 B1 * | 8/2002 | Heigl | ............... | B60R 21/201 280/730.2 |
| 6,517,108 B1 * | 2/2003 | Vinton | ............... | B60R 21/239 280/735 |
| 6,811,184 B2 * | 11/2004 | Ikeda | ............... | B60R 21/232 280/730.2 |
| 7,793,977 B2 * | 9/2010 | Sato | ............... | B60R 21/2338 280/730.2 |
| 8,727,376 B2 * | 5/2014 | Goto | ............... | B60R 21/262 280/730.2 |
| 9,415,742 B1 * | 8/2016 | Sasakura | ............ | B60R 21/2346 |
| 10,640,076 B2 * | 5/2020 | Lee | ............... | B60R 21/233 |
| 2006/0202456 A1 * | 9/2006 | Bernat | ............... | B60R 21/239 280/739 |
| 2007/0246922 A1 * | 10/2007 | Manssart | ............ | B60R 21/239 280/739 |
| 2008/0284147 A1 * | 11/2008 | Goto | ............... | B60R 21/239 280/736 |
| 2009/0218796 A1 * | 9/2009 | Webber | ............... | B60R 21/233 280/740 |
| 2009/0289444 A1 * | 11/2009 | Keshavaraj | ......... | B60R 21/239 280/736 |
| 2010/0038889 A1 * | 2/2010 | Feller | ............... | B60R 21/239 280/728.3 |
| 2011/0298200 A1 * | 12/2011 | Taniguchi | ............ | B60R 21/232 280/736 |
| 2012/0292896 A1 * | 11/2012 | Higuchi | ............... | B60R 21/239 280/731 |
| 2014/0265275 A1 * | 9/2014 | Rickenbach | .......... | B60R 21/232 280/739 |
| 2015/0084316 A1 * | 3/2015 | Okuhara | ............ | B60R 21/2338 280/729 |
| 2015/0115581 A1 | 4/2015 | Mazanek et al. | | |
| 2015/0298643 A1 * | 10/2015 | Schneider | ............. | B60R 21/239 280/729 |
| 2015/0298644 A1 * | 10/2015 | Charpentier | .......... | B60R 21/233 280/729 |
| 2016/0075303 A1 | 3/2016 | Iida et al. | | |
| 2016/0167615 A1 * | 6/2016 | Hiruta | ................ | B60R 21/2342 280/739 |
| 2016/0229370 A1 | 8/2016 | Hampson et al. | | |
| 2016/0280178 A1 | 9/2016 | Kruse et al. | | |
| 2017/0197578 A1 * | 7/2017 | Hatfield | ............. | B60R 21/239 |
| 2018/0251093 A1 * | 9/2018 | Rose | ................... | B60R 21/231 |

FOREIGN PATENT DOCUMENTS

| | | | | |
|---|---|---|---|---|
| CN | 103448660 A | 12/2013 | | |
| CN | 203543883 U | 4/2014 | | |
| CN | 203543885 U | 4/2014 | | |
| CN | 105416224 A | 3/2016 | | |
| CN | 105593076 A | 5/2016 | | |
| CN | 105946778 A | 9/2016 | | |
| CN | 205686357 U | 11/2016 | | |
| DE | 3200140 A1 | 10/1982 | | |
| DE | 69915633 T2 | 8/2004 | | |
| DE | 102007028803 A1 | 12/2008 | | |
| DE | 102007042044 A1 | 3/2009 | | |
| DE | 102009053381 A1 * | 5/2011 | .......... | B60R 21/233 |
| DE | 102009053381 A1 | 5/2011 | | |
| DE | 102011087449 A1 | 6/2013 | | |
| DE | 102013221983 A1 | 4/2015 | | |
| DE | 112014004246 T5 | 6/2016 | | |
| DE | 112014004246 T5 * | 6/2016 | .......... | B60R 21/213 |
| JP | 08188112 A * | 7/1996 | | |
| JP | 11348710 A * | 12/1999 | ....... | B60R 21/23138 |
| WO | 2008155261 A1 | 12/2008 | | |
| WO | WO-2020078881 A1 * | 4/2020 | .......... | B60R 21/239 |

OTHER PUBLICATIONS

Machine Translation of DE-112014004246-T5 (Year: 2014).*
DE Office Action dated Mar. 18, 2019 in the corresponding DE application (application No. 11 2017 000 630.9).
CN First Office Action dated Sep. 8, 2017 in the corresponding CN application (application No. 201610356891.3).
International Search Report dated Aug. 24, 2017 in the corresponding application (application No. PCT/CN2017/085427).
CN First Office Action dated Sep. 8, 2017 in the corresponding on CN application (application No. 201610356891.3).

* cited by examiner

SAFETY AIRBAG

CROSS-REFERENCE TO RELATED APPLICATIONS

The present application is the national phase of International Application No. PCT/CN2017/085427, filed on May 23, 2017, which claims priority to Chinese Application No. 201610356891.3, filed on May 25, 2016, both of which are incorporated herein by reference in their entireties.

TECHNICAL FIELD

The present disclosure relates to the technical field of auto accessories, and more particularly, to a safety airbag.

BACKGROUND

The safety airbag is used to provide effective collision protection for occupants in the event of a vehicle crash. In general, in the event of a side collision, a side curtain airbag is used as a safety airbag device for protecting the head of the occupant, which can simultaneously protect multiple rows of occupants.

A traditional side curtain airbag is generally mounted on a side metal panel, extending from a front pillar to a rear pillar of a vehicle, located above interiors of the pillars, and covered by an edge of a roof so that such side curtain airbag is invisible inside the vehicle. When the vehicle is subjected to a side impact, the side curtain airbag will be inflated rapidly upon an activating signal transmitted from the electronic control unit (ECU), and the side curtain airbag will push the roof away, expand downward across the interiors, cover a side window area, and form a protection cushion between a side of the seat and the vehicle body interior, thereby forming buffer areas between a head of an occupant and the vehicle body and between the head of the occupant and an outer rigid structure, to protect the head of the occupant. The traditional side curtain airbag may form a front seat side protection air chamber and a rear seat side protection air chamber, which may protect a side area from the front pillar to the rear pillar.

In the event of a front impact, the safety airbag device that can protect the heads of the front occupants generally includes a driver safety airbag and a front passenger safety airbag. For the rear occupants, only safety belts are generally used for protection. However, in regulatory tests, for example according to China-New Car Assessment Program (C-NCAP), the overall safety rating of the vehicle may be lowered due to many scores lost by lacking of airbag protection for the head and neck of the dummy on the rear seat.

In an actual collision accident, the collision generally has a certain collision angle, that is, there are both forward and lateral collision components. Therefore, for the occupants, if only the side curtain airbag is deployed, the protection effect is incomplete. In the past, it has been proposed to mount safety airbags on the back of the front seats to provide front-side collision protection for the rear occupants. However, this solution requires an addition of safety airbags on the back of the front seats, which will lead a lot of complicated issues to seat structure, cost, control strategies, and so on. Therefore, the feasibility of the solution is so low that it still cannot be applied to the market.

In addition, an actual investigation showed that in traffic accidents, small offset collisions accounted for 25% of the all front-side collision accidents and 15% of all traffic accidents. As a result, manufacturers of high-end vehicles began to test vehicles with the small offset collisions. For this type of collision, a typical energy-absorbing structure in the vehicle body, such as a bumper and a front longitudinal beam, cannot function properly. Therefore, this poses a higher requirement for the safety of vehicle, especially for the protection performance of airbags. And from August 2012, the Insurance Institute for Highway Safety (IIHS) introduced a 25% front-side offset collision for evaluation. In the 25% small offset collision process, due to the effect of inertia, the driver's head easily slides into a space between the driver side airbag and the side curtain airbag. Due to the absence of airbag protection at this location, it is easy to make the driver's head directly in contact with the rigid plastic board of A-pillar and cause an excessive damage. Therefore, it causes poor front-side protection effect for front occupants.

In summary, the traditional vehicle safety airbag systems cannot provide front-side collision protection for occupants. Therefore, the traditional vehicle safety airbag systems have the technical problem of being unable to provide comprehensive collision protection for occupants.

SUMMARY

In view of the above, it is necessary to provide a safety airbag for addressing the problem that the traditional vehicle safety airbag systems cannot provide comprehensive collision protection for the occupants.

A safety airbag is provided, including: an airbag having a side air curtain and a front air bag; an gas-guiding bag configured to guide gas generated from a gas generator into the airbag; and a backflow prevention assembly connected to the gas-guiding bag, and configured to prevent gas in the front air bag from flowing back to the side air curtain when the front air bag is extruded.

The above-mentioned safety airbag integrates the side air curtain with the front air bag to provide front-side protection for the occupants. In the event of a vehicle collision, the front air bag can provide protection for the occupant's head and neck, to reduce damage to the occupant's head and neck and provide comprehensive collision protection for the occupant. In addition, for the above safety airbag, it is provided with a backflow prevention assembly inside a gas outlet corresponding to the front air bag. In the event of vehicle collision, when the front air bag is extruded by an impact of the occupant, the backflow prevention assembly can form a closed structure to close the gas flow channel, thereby blocking the flow of the gas. The gas in the front airbag is prevented from flowing back to the side air curtain, so as to ensure that the front safety airbag still maintains a certain degree of stiffness when being extruded, and that the occupant's head can be protected better. In addition, compared with the addition of one rear row front-side protection airbag for the rear row occupant behind the front seat, the above-mentioned safety airbag has a better economy and a more promising application prospect by integrating the side air curtain with the front air bag.

In one embodiment, the gas-guiding bag includes a gas-guiding bag body and a gas-guiding member, and the gas-guiding bag body is connected to the gas generator, the gas-guiding member is connected to the gas-guiding bag body and the airbag respectively, and the backflow prevention assembly is connected to the gas-guiding member.

In one embodiment, the backflow prevention assembly includes a plurality of blades, one end of each of the plurality of blades is connected to an inner wall of the gas-guiding member, another end of each of the plurality of blades extends toward the front air bag when the front air bag is inflated, the plurality of blades are arranged sequentially and adjacent to each other, and adjacent blades contact each other;

the adjacent blades are separated from each other to form an inflating opening for inflating the front air bag, when the front air bag is inflated; and the adjacent blades contact each other and abut against each other, and the inflating opening is closed to prevent the gas in the front air bag from flowing back to the side air curtain, when the front air bag is extruded after being inflated.

In one embodiment, the above safety airbag further includes a pressure-limiting member capable of balancing times of inflating the side air curtain and the front air bag, and the pressure-limiting member is connected to the gas-guiding member, and disposed adjacent to the backflow prevention assembly.

In one embodiment, the pressure-limiting member includes a first plurality of tearable sewing threads, one end of each of the first plurality of sewing threads is sewn to the gas-guiding member, and another end of each of the first plurality of sewing threads extends in an arc shape.

In one embodiment, the pressure-limiting member includes a second plurality of sewing threads, each of the second plurality of sewing threads includes a fixed section and a tearable section, the fixed section is sewn to the gas-guiding member, one end of the tearable section is connected to the fixed section, and another end of the tearable section extends in an arc shape.

In one embodiment, the pressure-limiting member is funnel-shaped.

In one embodiment, the fixed section has a strength greater than the tearable section.

In one embodiment, the front air bag further includes an inner pull strap disposed inside the front air bag. When the front air bag is inflated, the inner pull strap can restrain a deployment posture of the front air bag.

In one embodiment, the front air bag is disposed in front of an occupant seating area of a front and/or rear seat.

DETAILED DESCRIPTION

The following further describes the present disclosure in detail with reference to the accompanying drawings and embodiments. It should be understood that the embodiments to be described are only used to explain the present disclosure and not used to limit the present disclosure.

Figure 1:
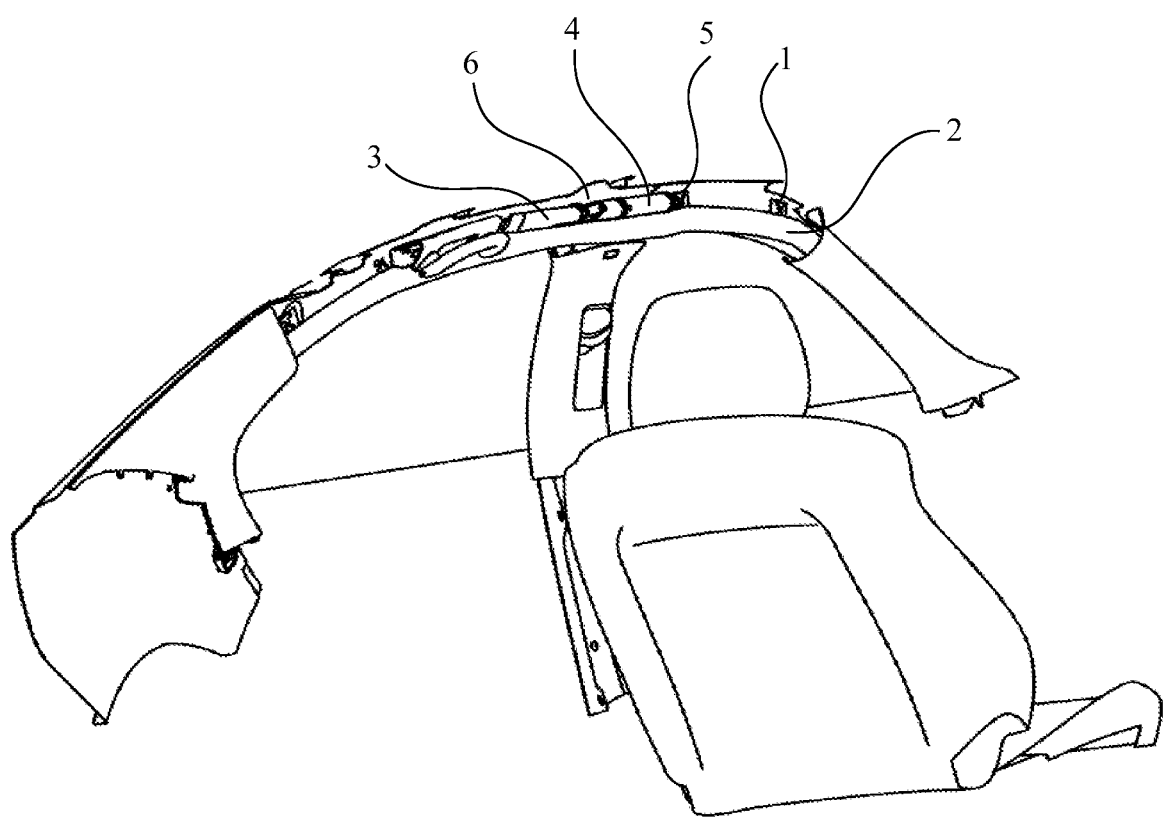
FIG. 1 is a structural schematic diagram illustrating a mounting configuration of a safety airbag according to one embodiment.
Figure 2:
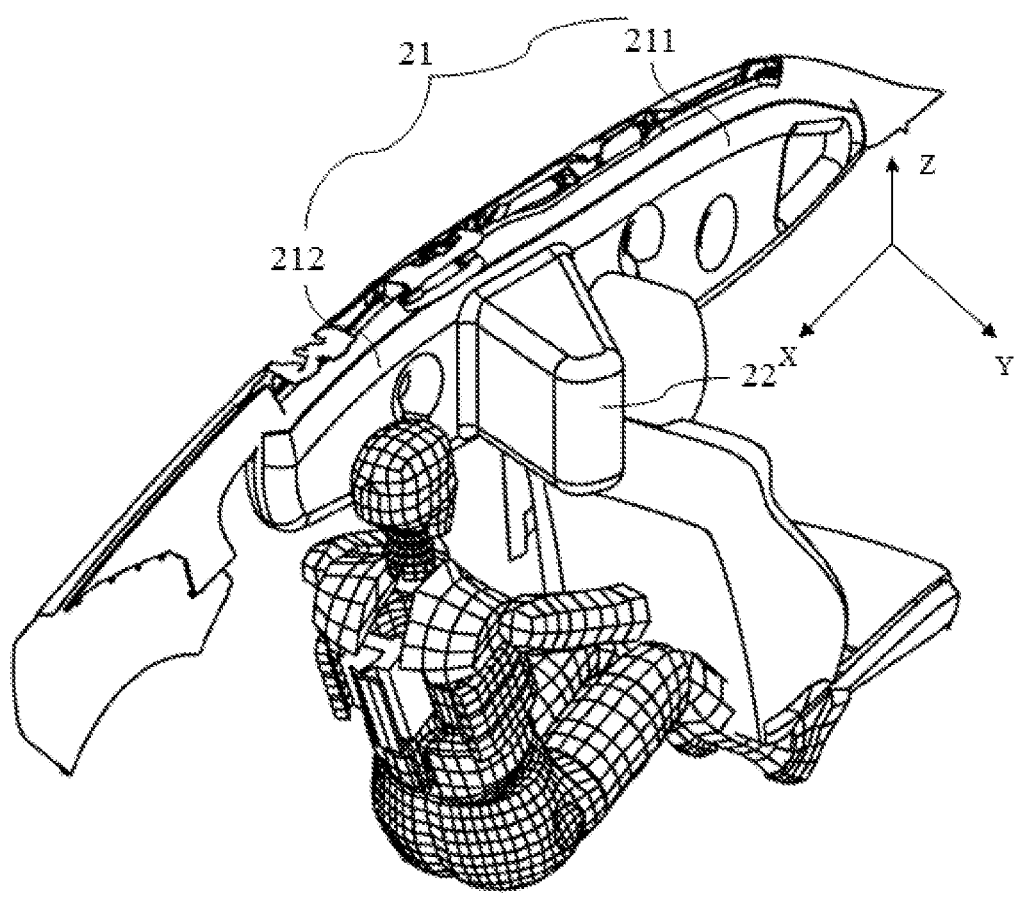
FIG. 2 is a structural schematic diagram illustrating an inflating configuration of a safety airbag according to one embodiment.
Figure 3:
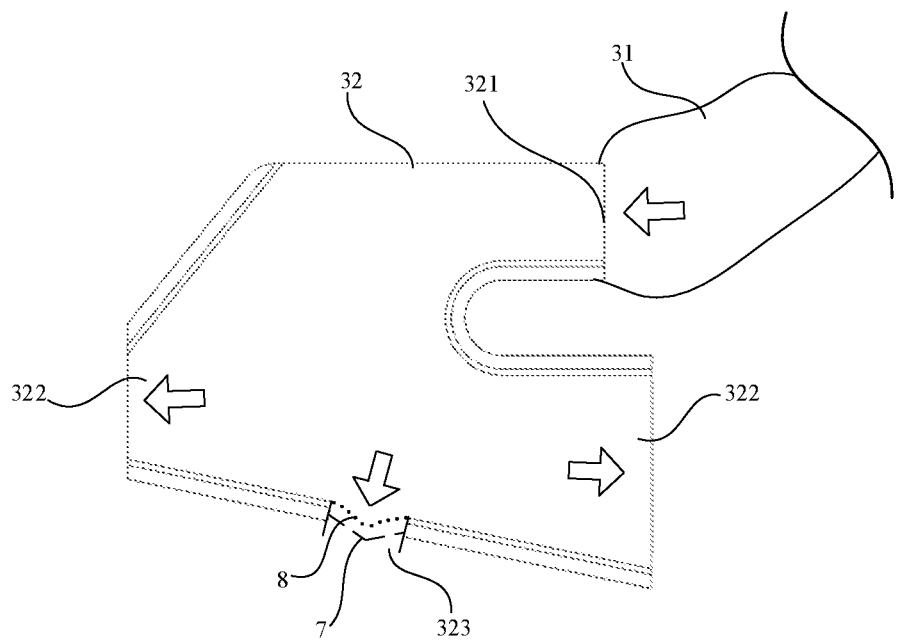
FIG. 3 is a structural schematic diagram illustrating a gas-guiding member according to one embodiment.

Referring to FIGS. 1 to 3, a safety airbag is provided, including: an airbag 2 having a side air curtain 21 and a front air bag 22; an gas-guiding bag 3 configured to guide gas generated from a gas generator 4 into the airbag 2; and a backflow prevention assembly 7 connected to the gas-guiding bag 3, and configured to prevent the gas in the front air bag 22 from flowing back to the side air curtain 21 when the front air bag 22 is extruded.

As shown in FIG. 2, the airbag 2 includes a front air bag 22 and a side air curtain 21. The front air bag 22 is connected to one side of the side air curtain 21, and the front air bag 22 is perpendicular to the side air curtain 21 after being deployed. An inflating port is provided at the joint of the front air bag 22 and the side air curtain 21.

As shown in FIGS. 1 and 3, the gas-guiding bag 3 includes a gas-guiding bag body 31 and a gas-guiding member 32. The gas-guiding bag body 31 is connected to the gas generator 4, and the gas-guiding member 32 is connected to the gas-guiding bag body 31 and the airbag 2 respectively. The backflow prevention assembly 7 is connected to the gas-guiding member 32.

In one embodiment, the gas-guiding member 32 is provided on the inflating port located on the joint of the front air bag 22 and the side air curtain 21. The gas-guiding member 32 is provided with a gas inlet 321, a first gas outlet 322 and a second gas outlet 323. The gas inlet 321 is communicated with the gas-guiding bag body 31, the first gas outlet 322 is communicated with the side air curtain 21, and the second gas outlet 323 is communicated with the front air bag 22. The backflow prevention assembly 7 is provided on the second gas outlet 323. When the front safety airbag 22 is extruded after being inflated, the backflow prevention assembly 7 can close the second gas outlet 323 to prevent the gas in the front air bag 22 from flowing back to the side air curtain 21.

As shown in FIG. 2, in this embodiment, the front air bag 22 is provided in front of a occupant seating area of a rear seat to provide front-side collision protection for the rear occupant. The side air curtain 21 includes a front side air curtain 211 and a rear side air curtain 212. The front side air curtain 211 and the rear side air curtain 212 are integrally connected to the front air bag 22. The joint of the front row side air curtain 211, the rear row side air curtain 212 and the front air bag 22 is provided with an inflating interface. In one embodiment, the inflating interface is a three-way inflating interface with three inflating ports including an inflating port for the front side air curtain, an inflating port for the rear side air curtain and an inflating port for the front air bag. Accordingly, as shown in FIG. 3, the gas-guiding member 32 has two first gas outlets 322 and one second gas outlet 323. One of the first gas outlets 322 is communicated with the inflating port for the front row side air curtain, and the other of the first gas outlets 322 is communicated with the inflating port for the rear side air curtain. The second gas outlet 323 is communicated with the inflating port for the front air bag.

The backflow prevention assembly 7 includes a plurality of blades. One end of each of the plurality of blades is connected to an inner wall of the gas-guiding member 32. Another end of each of the plurality of blades extends toward the front air bag 22 when the front air bag 22 is inflated. The plurality of blades is arranged sequentially and adjacent to each other, and adjacent blades contact each other. When the front air bag 22 is inflated, adjacent blades are separated from each other to form an inflating opening for inflating the front air bag 22. When the front air bag 22 is extruded after being inflated, the adjacent blades contact each other and abut against each other, and the inflating opening is closed to prevent the gas in the front air bag 22 from flowing back to the side air curtain 21.

Figure 4:
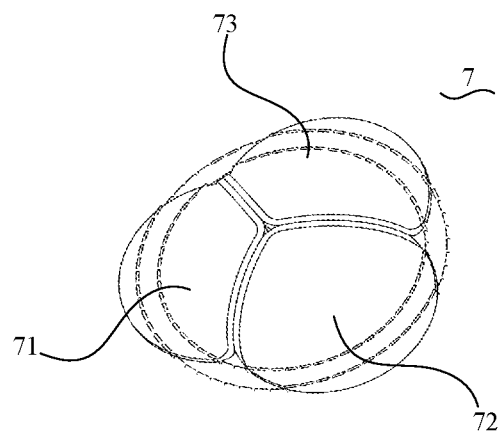
FIG. 4 is a structural schematic diagram illustrating a backflow prevention assembly according to one embodiment, where blades of the backflow prevention assembly abut against each other to form a closed structure.

In one embodiment, as shown in FIGS. 3 and 4, the backflow prevention assembly 7 includes three blades, that is, a first blade 71, a second blade 72 and a third blade 73. One end of each of the first blade 71, the second blade 72 and the third blade 73 is connected to the inner wall of the second gas outlet 323. When the front air bag 22 is inflated, another end of each of the first blade 71, the second blade 72 and the third blade 73 extends toward the front air bag 22. The first blade 71, the second blade 72 and the third blade 73 are arranged sequentially and adjacent to each other, and adjacent blades contact and are connected to each other. When the front air bag 22 is inflated, the first blade 71, the second blade 72, and the third blade 73 are separated from each other to form an inflating opening for inflating the front air bag 22. When the front air bag 22 is extruded after being inflated, the first blade 71, the second blade 72, and the third blade 73 contact each other and abut against each other to form a closed structure to close the second gas outlet 323 to prevent the gas in the front air bag 22 from flowing back to the side air curtain 21.

In this embodiment, edges of the first blade 71, the second blade 72 and the third blade 73 are in contact. As shown in FIG. 4, one side of the blade 331 is in contact with one side of the blade 332, another side of the blade 332 is in contact with one side of the blade 333, and another side of the blade 333 is in contact with another side of the blade 331. Furthermore, in one embodiment, in order to enhance the sealing effect when the blades are in contact, a sealing strip may be provided on each side where the first blade 71, the second blade 72 and the third blade 73 contact each other, to enhance the sealing performance.

Figure 5:
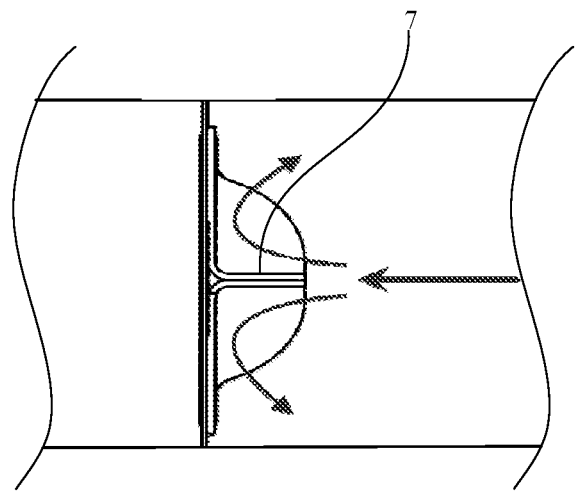
FIG. 5 is a schematic diagram illustrating a flow of gas when the backflow prevention assembly of FIG. 4 forms the closed structure to block flow of the gas.

Each of the first blade 71, the second blade 72 and the third blade 73 has a certain degree of hardness. The first blade 71, the second blade 72 and the third blade 733 contact each other to form a tricuspid valve structure that is similar to the right atrioventricular valve of the right atrium of the human heart. The backflow prevention assembly 7 allows gas to pass through to inflate the front air bag 22 during the process of inflating. However, the gas filled into the chamber of the front air bag 22 may not be returned to the two air curtain chambers on both sides. When the front air bag 22 is inflated, the first blade 71, the second blade 72 and the third blade 73 are separated from each other under the effect of the gas flow, and the tricuspid valve structure is opened. The tricuspid valve is in an open state, and the gas flows into the chamber of the front air bag 22 more easily. As shown in FIG. 5, in the event of a vehicle collision, when the front air bag 22 is extruded by the head of the occupant, the pressure in the chamber of the front air bag 22 increases, and the backflow prevention assembly 7 contracts. At this time, the gas in the chamber of the front air bag 22 pushes against the tricuspid valve structure, so that the three blades 331, 332 and 333 abut against each other, and the first blade 71, the second blade 72 and the third blade 73 hold each other to form a closed structure that closes the gas flow channel to achieve the effect of blocking the gas flow. In this way, it can ensure that the front air bag maintains a certain degree of stiffness when it is extruded, thereby protecting the head of the occupant.

Figure 6:
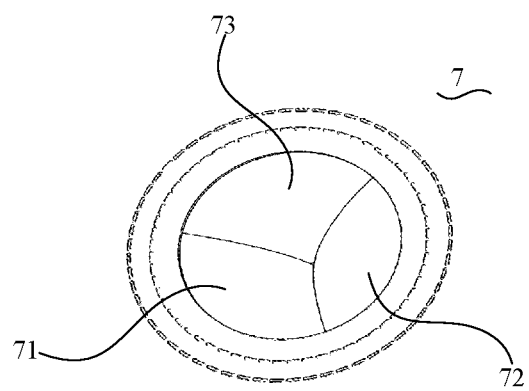
FIG. 6 is a structural schematic diagram illustrating a backflow prevention assembly according to another embodiment, where blades of the backflow prevention assembly abut against each other to form a closed structure.
Figure 7:
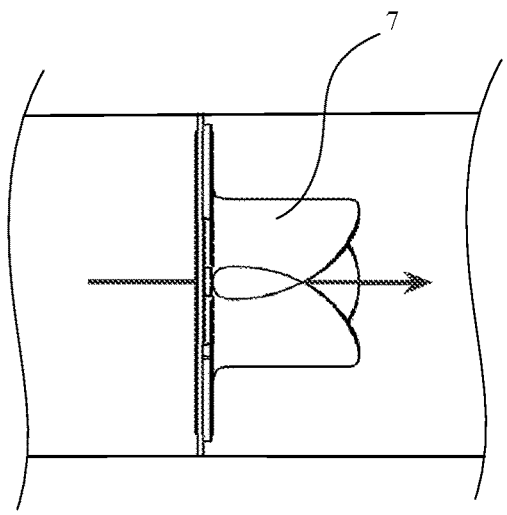
FIG. 7 is a schematic diagram illustrating a flow of gas when the backflow prevention assembly of FIG. 6 is inflated positively.

In the above embodiment, the first blade 71, edges of the second blade 72 and the third blade 73 are in contact. In yet another embodiment, the first blade 71, the second blade 72 and the third blade 73 may also be superimposed on each other. In one embodiment, as shown in FIG. 6, one side of the first blade 71 is superimposed on one side of the second blade 72, another side of the second blade 72 is superimposed on one side of the third blade 73, and another side of the third blade 33 is superposed on another side of the first side 331. Each of the first blade 71, the second blade 72 and the third blade 73 has a certain degree of hardness. The first blade 71, the second blade 72 and the third blade 733 are in contact and superimposed on each other, so that the gas can pass through to inflate the front air bag 22 during the process of inflating. However, the gas filled into the chamber of the front air bag 22 may not be returned to the two air curtain cavities on both sides. As shown in FIG. 7, when the gas flows toward the front air bag 22, the first blade 71, the second blade 72 and the third blade 73 are separated, so that the gas can smoothly reach inside the chamber of the front air bag 22. When the front air bag 22 is extruded by an impact of the occupant, the pressure in the chamber of the front air bag 22 increases, and the backflow prevention assembly 7 contracts, so that the first blade 71, the second blade 72 and the third blade 73 can hold each other, so as to close the flow channel to achieve the effect of gas backflow prevention. In this way, the front air bag 22 can maintain the rigidity design requirement.

In one embodiment, in the above embodiment, as shown in FIGS. 4 and 5, the first blade 71, the second blade 72 and the third blade 73 are the same in structure, and each blade includes three sides. One of the three sides is connected to an inner wall of the second gas outlet, the other two of the three sides are connected to sides of adjacent blades respectively. The two sides connected to the sides of the adjacent blades extend in an arc shape and a reduced manner. The blade protrudes out of the backflow prevention member 7 in the extending direction. In other embodiments, each of the first blade 71, the second blade 72 and the third blade 73 may be triangular in shape.

In the above embodiment, the backflow prevention assembly 7 includes three blades. However, it should be noted that the present disclosure does not limit the specific number of blades, and the specific number of blades may be set according to practical applications and may be more than or less than three. For example, there may be two, four or more blades. The backflow prevention assembly 7 in the above embodiment includes three blades, which is only an example, and is not used to limit the present disclosure.

The safety airbag in this embodiment is mounted and fixed in a manner similar to that of a side air curtain. In one embodiment, it may be mounted on a side metal panel by means of a generator bracket and a side air curtain fastener. As shown in FIG. 1, in one embodiment, the mounting configuration of the safety airbag may include a mounting point fastener 1, an airbag 2, a gas-guiding bag 3, a gas generator 4 and a generator bracket 5. The airbag 2 is connected to the gas-guiding bag 3, the gas-guiding bag 3 is connected to the gas generator 4, the gas generator 4 is connected to the generator bracket 5, and the mounting point fastener 1 is connected to the side air curtain. The side air curtain is mounted on the side metal panel 6 by the mounting point fastener 1 and a bolt on the generator bracket 5.

The safety airbag in this embodiment is mounted in the same mounting method as a side air curtain. However, it should be noted that each mounting point of the side air curtain can withstand a specific amount of tensile force, and there is a new added front air bag in the rear row, so an additional mounting point (not shown) is required at the position of the front air bag to ensure that the air bag can be 100% constrained by the mounting point. Therefore, two mounting points are added at the position of the front air bag and the distance between the two mounting points is smaller than the distance between two mounting points at other areas, which make the connection more stable.

In this embodiment, it is provided with three inflatable chambers. Therefore, the generator is required to generate more gas in a short time. A high-power generator or multiple generators may generally be used to achieve the same effect. Accordingly, the generator bracket needs a higher strength to cooperate with the generator with high output power. The higher the power of the generator is, the higher the strength of the generator bracket is required. In this embodiment, the generator bracket may be made of a material of HC 420 with 420 Mpa~520 Mpa yield strength, and 470 Mpa~590 Mpa tensile strength.

The safety airbag in this embodiment integrates the side air curtain with the front air bag 22 to provide front-side protection for the occupant. In the event of vehicle collision, it provides protection for the occupant's head and neck, to reduce damage to the occupants' head and neck. Furthermore, the second gas outlet 323 of the above safety airbag is provided with the backflow prevention assembly 7. When the front air bag on the rear row is inflated, the direction of the gas flow is the same as the extending direction of the blades, so that the first blade 71, the second blade 72, and the third blade 73 are separated from each other under the action of the gas flow, and the backflow prevention assembly 7 is in an open state, and the gas flows into the chamber of the front air bag 22 to inflate the front air bag 22. In the event of the collision, when the front air bag 22 is extruded by an impact of the occupant, the pressure in the chamber of the front air bag 22 increases. At this time, the gas is pushed back to the backflow prevention device 7, and all blades of the backflow prevention device 7 abut against each other to form a closed structure for closing the gas flow channel, so as to achieve the effect of blocking the gas flow. In this way, it can ensure that the front safety airbag 22 still maintains a certain degree of stiffness when being extruded, so that the occupant's head can be protected better. In addition, compared with the addition of one rear row front-side protection safety airbag for the rear row occupant behind the front seat, the above-mentioned safety airbag has a better economy and a more promising application prospect by integrating the side air curtain with the front air bag.

As shown in FIG. 3, in one embodiment, the gas-guiding bag 3 further includes a pressure-limiting member 8 capable of balancing times of inflating the side air curtain 21 and the front air bag 22. The pressure-limiting member 8 is connected to the gas-guiding member 32. The pressure-limiting member 8 is disposed adjacent to the backflow prevention member 7.

In one embodiment, the pressure-limiting member 8 is provided at the second gas outlet 323 and is located inside the backflow prevention assembly 7. The pressure-limiting member 8 includes a first plurality of tearable sewing threads. One end of each of the first plurality of sewing threads is sewn to the gas-guiding member 32, and another end of each of the first plurality of sewing threads extends in an arc shape and extends into the second gas outlet 323.

In one embodiment, the end of each first sewing thread extending in an arc shape is in a non-closed state, and the pressure-limiting member 8 is funnel-shaped. The funnel-shaped structure can form stress concentration to direct the gas into the front air bag 22 and can effectively control the weaker sewing thread to be broken at the funnel-shaped structure (i.e., at the fixed end).

In general, the ready time required by the side air curtain is approximately 30 ms, while the ready time required by the front air bag is approximately 40 ms. In order to balance the ready times of the side air curtain 21 and the front air bag 22, in this embodiment, the pressure limitation of the front air bag 22 is achieved by providing the pressure-limiting member 8. In one embodiment, the pressure-limiting function is achieved by controlling the strength of the first sewing thread. The first sewing thread is a weaker sewing thread, and the free end of each first sewing thread is in a non-closed state and presents a funnel shape on the whole. When the gas generator 4 inflates the airbag 2 and the gas pressure does not reach the specified pressure, the first weaker sewing thread will not be broken. At this point, the inflation of the front air bag 22 will be greatly hindered, and a large amount of gas will be filled into the front side air curtain 211 and the rear side air curtain 212. The front side air curtain 211 and the rear side air curtain 212 will be inflated firstly, and only a small amount of gas enters the front air bag 22 at this time, which facilitates the front air bag 22 to be pushed out of the roof. When the gas pressure reaches a certain level, the first sewing thread is broken, and the first sewing thread is broken at the funnel (i.e., the fixed end). As a result, the gas enters the front air bag 22. At this point, the front air bag has been completely pushed the roof away. At the same time, the inflating speed of the front air bag 22 is greatly accelerated due to the breakage of the first sewing thread. When the inflating pressure reaches a specific pressure, the side air curtain 21 is fully pushed the roof away and deployed downward. At this time, inflating the front air bag 22 integrated on the side air curtain 21 helps to reduce the inflation of the roof by the front air bag 22.

In general, the specified pressure of the above inflating gas ranges from 20 KPa~40 KPa.

Further, if the first sewing thread is directly connected to the gas-guiding member 32, the inner wall of the gas-guiding member may be torn when the first sewing thread is torn, thereby causing the damage to the gas-guiding member 32 and affecting the stability of the safety airbag. In one embodiment, a second sewing thread 81 is provided to protect the gas-guiding member 32.

Figure 8:
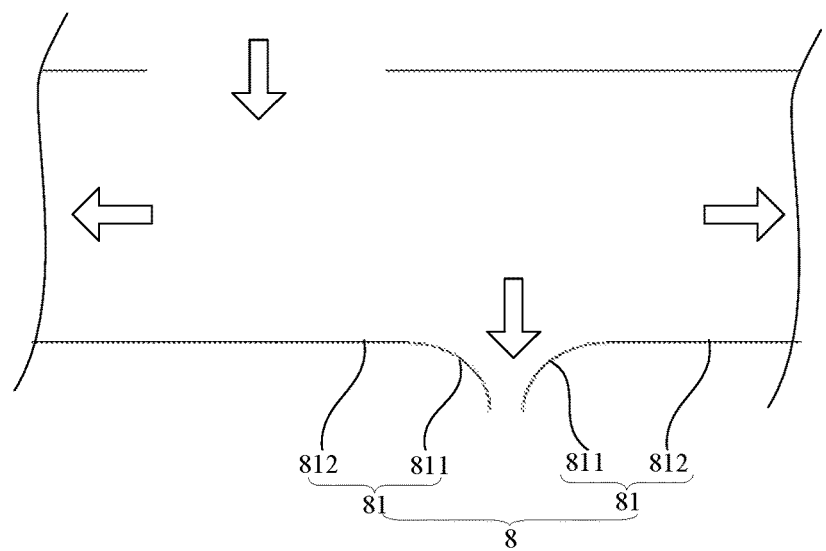
FIG. 8 is a structural schematic diagram illustrating a pressure-limiting member according to one embodiment.

As shown in FIG. 8, the pressure-limiting member 8 includes a second plurality of sewing threads 81. Each of the second plurality of sewing threads 81 includes a fixed section 811 and a tearable section 812. The fixed section 811 is sewn to the gas-guiding member 32. One end of the tearable section 812 is connected to the fixed section 811, another end of the tearable section 812 extends in an arc shape and extends into the second gas outlet 323.

In one embodiment, the strength of the fixed section 811 is greater than the strength of the tearable section 812. One end of the fixed section 811 is sewn to the inner wall of the gas-guiding member 32, and another end of the fixed section 811 is sewn to the tearable section 812. One end of the tearable section 812 is sewn to the fixed section 811, and another end of the tearable section 812 extends into the second gas outlet 323. One end of the tearable section 812 extending in an arc shape is in a non-closed state, and the pressure-limiting member 8 is funnel-shaped on the whole.

In this embodiment, the pressure-limiting member 8 includes two sewing threads with different strengths. The tearable section 812 is thinner and has a lower strength, while the fixed section 811 is thicker and has a higher strength. The tearable section 812 with lower strength is bound off by sewing. The diameter of the initial inflating channel of the second gas outlet 323 is maintained at a relatively low level. When the pressure reaches a specific level, the tearable section 812 is torn from a position connected to the fixed section 811, and the connection between the tearable section 812 and the fixed section 811 is broken. Therefore, the diameter of the inflating passage entering the chamber of the front air bag 22 is increased, so that the front air bag 22 can be fully inflated.

Figure 9:
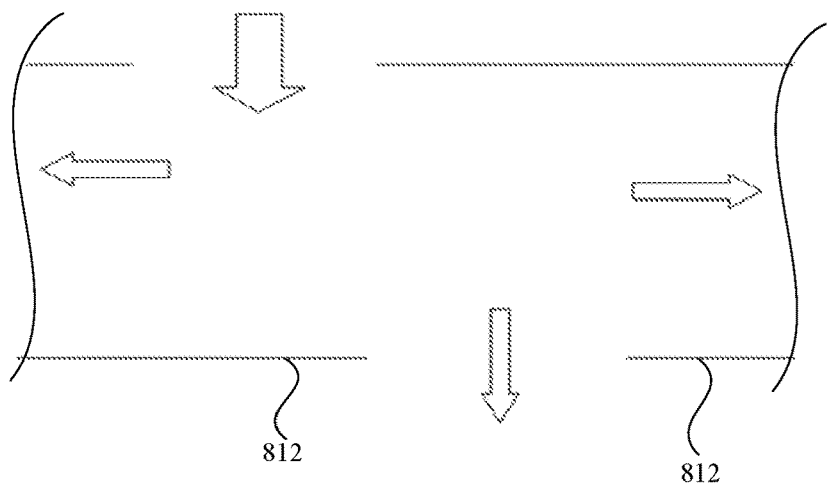
FIG. 9 is a schematic diagram illustrating that the front air bag is inflated after a tearable section of the pressure-limiting member of FIG. 8 is torn.

In this embodiment, the tearable section 812 is connected to the inner wall of the second gas-guiding member 32 through the fixed section 811. As shown in FIG. 9, when the specified inflating pressure is reached, the tearable section 812 is torn from the position connected to the fixed section 811. Due to higher strength, the fixed section 811 will not be broken, so that the inner wall of the gas-guiding member 32 will not be damaged, thereby effectively protecting the inner wall of the gas-guiding member 32 and improving the performance of the safety airbag.

In one embodiment, the front air bag 22 further includes an inner pull strap disposed inside the front air bag 22. When the front air bag 22 is inflated, the inner pull strap can restrain the deployment posture of the front air bag 22.

Figure 10:
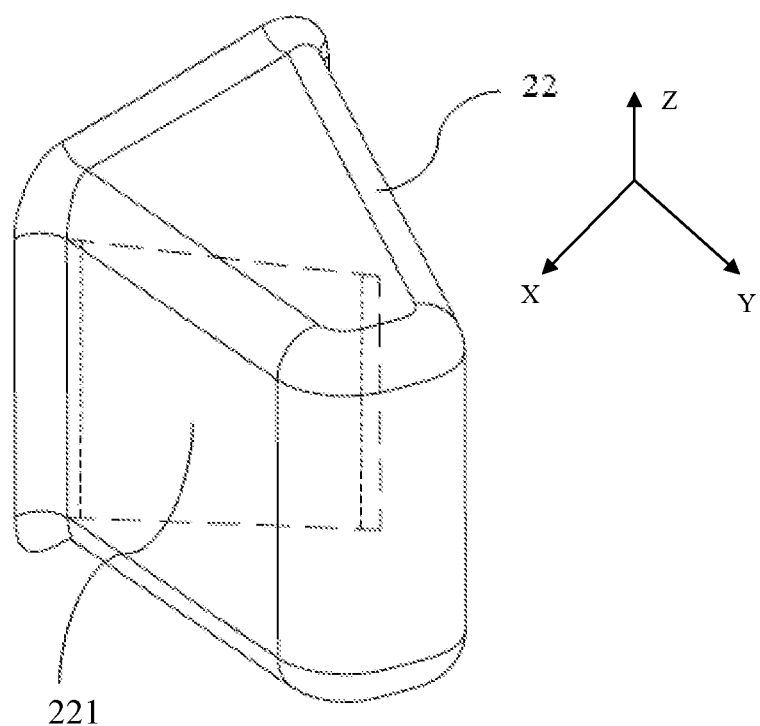
FIG. 10 is a schematic diagram illustrating an inflating configuration of a front air bag according to an embodiment.

In one embodiment, as shown in FIG. 10, an inner pull strap 221 is provided inside the front air bag 22. The left end of the inner pull strap 221 is sewn to the side wall of the front air bag 22 close to the inflating port, and the right end of the inner pull strap 221 is sewn to the free end of the front air bag 22. The upper and lower ends of the inner pull strap 221 are not sewn to the front air bag. During the deployment, the inner pull strap can constrain the movement of the front air bag in the X-axis direction, so that the safety airbag can be deployed toward the Y-axis positive direction. The inner pull strap 221 can restrain the front air bag 22 to ensure the deployment posture of the front air bag. In addition, the upper and lower ends of the inner pull strap 221 are not sewn to the front air bag 22, so that the inner pull strap 221 is gradually deployed during inflating, and the gas gradually fills the side of the front air bag 22 facing toward the occupant through the upper and lower ends of the inner pull strap 221, thereby avoiding the damage caused by instant inflation to the occupant, and playing a buffer role.

In one embodiment, after the front air bag 22 is deployed, the overall outer contour of the front air bag 22 is in a shape of a cylinder or a triangle. In another embodiment, after the front air bag 22 is deployed, the horizontal cross section of the outer contour of the front air bag 22 is in a shape of a wedge.

Referring to Table 1, it illustrates the comparison of neck parameters of a dummy in a rear seat in the front-side rigid collision with 50 km/h, between the safety airbag with a front air bag according to this embodiment and a side air curtain module without a front air bag. HIC means Head Injury Criterion.

TABLE 1

Test comparison table of 50 km/h frontal rigid impact vehicle

| Parameter Variable | Side IIs Dummy (5% Female Dummy) Safety Airbag according to the Present Disclosure | Side IIs Dummy (5% Female Dummy) Air Curtain |
| --- | --- | --- |
| Dummy Damage Value HIC 15 | 509 | 962 |
| Amount of Displacement of Neck (Nm) | 62 | 29.3 |
| Force applied to The Neck in Z-Direction (N) | 1284 | 2722 |
| Force applied to The Neck in X-Direction (N) | 1266 | 1374 |
| Amount of Compression of Chest (mm) | 35.65 | 37.58 |

Referring to Table 2, it illustrates the comparison of neck parameters of a dummy in a rear seat in a 64 km/h offset deformable barrier collision vehicle test, between the safety airbag mounting with a front air bag according to this embodiment and a side air curtain module without a front air bag. HIC means Head Injury Criterion.

TABLE 2

Test table for 64 km/h offset deformable barrier collision vehicle

| Parameter Variable | Side IIs Dummy Safety Airbag according to the Present Disclosure | Side IIs Dummy Air Curtain |
| --- | --- | --- |
| Dummy Damage Value HIC 15 | 480 | 693 |
| Amount of Displacement of Neck (Nm) | 29 | 29.3 |
| Force applied to The Neck in Z-Direction (N) | 1710 | 2770 |
| Force applied to The Neck in X-Direction (N) | 885 | 1,000 |
| Amount of Compression of Chest (mm) | 46 | 38.7 |

From the analysis and comparison between the Table 1 and the Table 2 above, it can be seen that the safety airbag in this embodiment can effectively provide front-side protection for the occupant. In the event of a vehicle collision, the safety airbag in this embodiment can provide protection for the occupant's head and neck, to reduce damage to the occupant's head and neck.

In the above embodiment, the number of the front air bag is one, and the front air bag is provided in front of the occupant seating area of the rear seat to provide front-side collision protection for the occupant in the rear seat. Accordingly, the gas-guiding member has two first gas outlets and one second gas outlet, which inflate the chambers of the three airbags respectively. However, it should be noted that this embodiment is not used to limit the specific number of front air bags, the position of the front air bag and the number of first gas outlets and second gas outlets. In practical applications, the number of the front air bags, the position of the front air bags, and the number of the gas outlets can be specifically set according to actual applications, just to ensure that the number of the second gas outlets on the gas-guiding member is the same as the number of the chambers of the front air bag. For example, in yet another embodiment, the number of front air bag is one, and the front air bag is provided in front of the occupant seating area of the front seat to provide the front-side collision protection for the front occupant. In other embodiments, the number of the front air bags may be more than one, for example, the number of the front air bags may also be two, and the two front air bags are provided in front of the occupant seating areas of the front and rear seats respectively to provide the front-side protection for the front and rear occupants at the same time. For different types of vehicles, the number of the front air bags may be more than two, and the front air bags are provided in front of the occupant seating area of each row of seats respectively to provide front-side protection for the occupants in each row of seats at the same time. When there are multiple front air bags, the number of second gas outlets is correspondingly increased.

Figure 11:
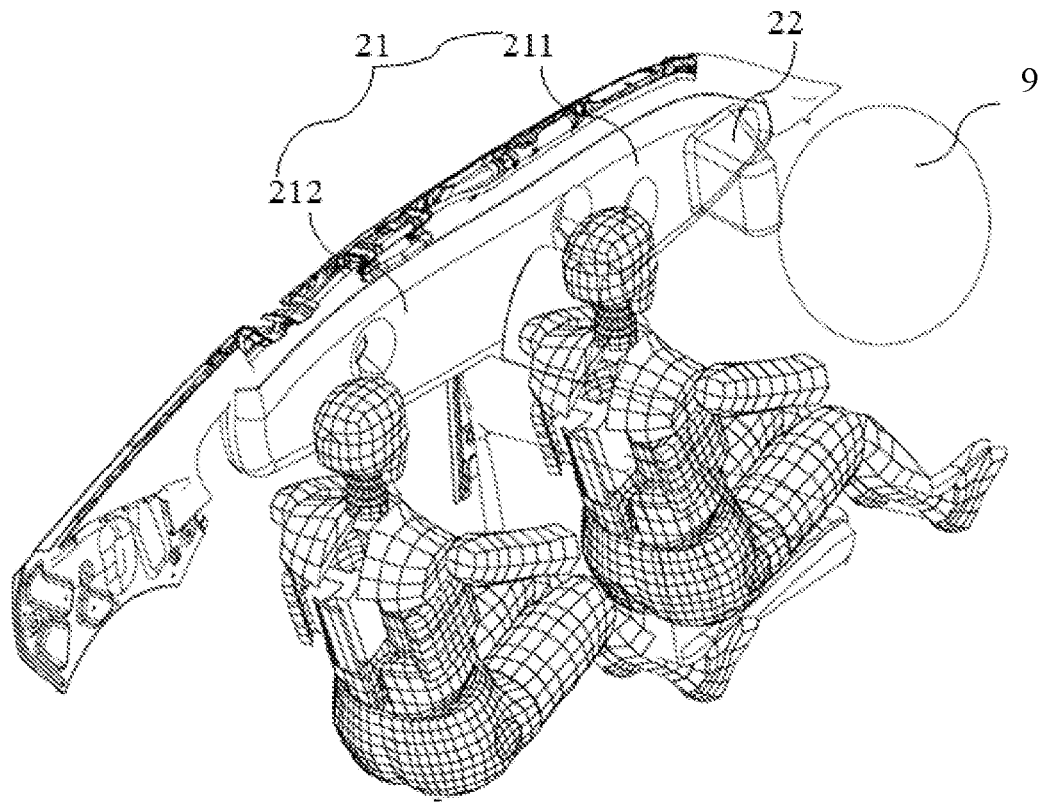
FIG. 11 is a schematic diagram illustrating an inflating configuration of a safety airbag according to yet another embodiment.

As shown in FIG. 11, it is schematic diagram illustrating an inflating configuration of a safety airbag according to yet another embodiment. In this embodiment, the number of the front air bag is one. The front air bag is provided in front of the occupant seating area of the front seat. The front air bag 22 is interposed between the front side air curtain 211 and the driver side airbag 9. During the actual vehicle collision, if the collision is similar to the small offset collision, the occupant will slide into a space between the front side air curtain 211 and the driver side airbag 9. At this point, the front air bag 22 protects the driver's head, which provides the front-side protection for the front occupant.

The difference between this embodiment and the previous embodiment is only the position of the front air bag. Accordingly, the position of the inflating port and the position of the mounting point can be adjusted according to the position of the front air bag. The other structures are the same as those of the previous embodiment and are not repeated here.

The above safety airbag integrates the side air curtain with the front air bag, and the backflow prevention assembly is provided inside the gas outlet corresponding to the front air bag. In the event of the collision, the backflow prevention assembly can form a closed structure to close the gas flow channel to ensure that the front safety airbag still maintains a certain degree of stiffness when being extruded, so that the occupant's head can be protected better. In the process of the vehicle front collision, the front air bag expanded from the above safety airbag can provide excellent protection for the front and rear occupants, reducing damage to the heads and necks of the front and rear row occupants, and providing comprehensive collision protection for the occupants. At the same time, compared with the addition of one rear row front-side protection safety airbag for the rear row occupant behind the front seat, the above safety airbag has a better economy and a more promising application prospect by integrating the side air curtain with the front air bag.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

What is claimed is:

1. A safety airbag, comprising:
an airbag having a side air curtain and a front air bag;
a gas-guiding bag comprising a gas-guiding bag body and a gas-guiding member, and configured to guide a gas generated from a gas generator into the airbag; and
a backflow prevention assembly connected to the gas-guiding bag which is configured to prevent the gas in the front air bag from flowing back to the side air curtain when the front air bag is extruded,
wherein the backflow prevention assembly comprises at least three blades, one end of each blade is connected to an inner wall of the gas-guiding member, adjacent edges of adjacent blades are superimposed and contacted with each other,
another end of each blade extends toward the front air bag, adjacent blades are separated from each other to form an inflating opening for inflating the front air bag, when the front air bag is inflated,
the adjacent blades contact each other and abut against each other, and the inflating opening is closed to prevent the gas in the front air bag from flowing back to the side air curtain, when the front air bag is extruded after being inflated, and
wherein the front air bag is disposed in front of an occupant seating area of a front and/or rear seat.

2. The safety airbag of claim 1, wherein the gas-guiding bag body is connected to the gas generator, the gas-guiding member is connected to the gas-guiding bag body and the airbag respectively, and the backflow prevention assembly is connected to the gas-guiding member.

3. The safety airbag of claim 2, further comprising a pressure-limiting member configured to balance time of inflating the side air curtain and the front air bag, and the pressure-limiting member is connected to the gas-guiding member, and disposed adjacent to the backflow prevention assembly.

4. The safety airbag of claim 3, wherein the pressure-limiting member comprises a first plurality of tearable sewing threads, one end of each of the first plurality of sewing threads is sewn to the gas-guiding member, and another end of each of the first plurality of sewing threads extends in an arc shape.

5. The safety airbag of claim 4, wherein the pressure-limiting member is funnel-shaped.

6. The safety airbag of claim 3, wherein the pressure-limiting member comprises a second plurality of sewing threads, each of the second plurality of sewing threads includes a fixed section and a tearable section, the fixed section is sewn to the gas-guiding member, one end of the tearable section is connected to the fixed section, and another end of the tearable section extends in an arc shape.

7. The safety airbag of claim 6, wherein the fixed section has a strength greater than the tearable section.

8. The safety airbag of claim 1, wherein the front air bag further comprises an inner pull strap provided inside the front air bag, and the inner pull strap is able to restrain a deployment posture of the front air bag when the front air bag is inflated.

* * * * *